United States Patent
Kelly

(10) Patent No.: US 10,860,385 B2
(45) Date of Patent: Dec. 8, 2020

(54) METHOD AND SYSTEM FOR ALLOCATING AND MIGRATING WORKLOADS ACROSS AN INFORMATION TECHNOLOGY ENVIRONMENT BASED ON PERSISTENT MEMORY AVAILABILITY

(71) Applicant: Dell Products L.P., Hopkinton, MA (US)

(72) Inventor: John Kelly, Mallow Cork (IE)

(73) Assignee: Dell Products L.P., Hopkinton, MA (US)

(*) Notice: Subject to any disclaimer, the term of this patent is extended or adjusted under 35 U.S.C. 154(b) by 242 days.

(21) Appl. No.: 15/966,295

(22) Filed: Apr. 30, 2018

(65) Prior Publication Data

US 2019/0332443 A1  Oct. 31, 2019

(51) Int. Cl.
  *G06F 9/50*  (2006.01)
(52) U.S. Cl.
  CPC ............ *G06F 9/5083* (2013.01); *G06F 9/505* (2013.01); *G06F 9/5016* (2013.01); *G06F 9/5038* (2013.01)
(58) Field of Classification Search
  CPC .... G06F 9/5083; G06F 9/5016; G06F 9/5038; G06F 9/505
  See application file for complete search history.

(56) References Cited

U.S. PATENT DOCUMENTS

| | | | |
|---|---|---|---|
| 2006/0047808 A1* | 3/2006 | Sharma | G06F 9/505 709/224 |
| 2010/0094966 A1* | 4/2010 | Zuckerman | H04L 67/1097 709/219 |
| 2014/0007121 A1* | 1/2014 | Caufield | G06F 9/4843 718/103 |
| 2019/0107960 A1* | 4/2019 | Sankaranarayanan | G06F 12/0246 |

OTHER PUBLICATIONS

Zhou et al. "HNVM: Hybrid NVM enabled datacenter design and optimization." Microsoft Research TR (2017), pp. 1-12. (Year: 2017).*

* cited by examiner

*Primary Examiner* — Meng Ai T An
*Assistant Examiner* — Willy W Huaracha
(74) *Attorney, Agent, or Firm* — Chamberlain, Hrdlicka, White, Williams & Aughtry

(57) ABSTRACT

A method and system for allocating and migrating workloads across an information technology (IT) environment based on persistent memory availability. Specifically, the method and system disclosed herein entail the intelligent placement of workloads on appropriate nodes of a node cluster based on workload requirements and node capabilities and/or resources availability. Further, workloads may be ranked based on a workload priority assigned to any particular workload, if available, or based on logged system calls issued by virtual machines hosting any particular workload. Subsequently, higher ranked workloads may be (Continued)

granted priority access to nodes that host healthier persistent memory, if any, or host higher performance traditional storage.

18 Claims, 11 Drawing Sheets

METHOD AND SYSTEM FOR ALLOCATING AND MIGRATING WORKLOADS ACROSS AN INFORMATION TECHNOLOGY ENVIRONMENT BASED ON PERSISTENT MEMORY AVAILABILITY

BACKGROUND

The increased prevalence of data-intensive applications has resulted in the development of persistent memory technologies to meet the needs of those applications. The deployment, however, of workloads instantiated by these applications to persistent memory capable environments poses significant complexity.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for allocating and migrating workloads across an information technology (IT) environment based on persistent memory availability. Specifically, one or more embodiments of the invention entails the intelligent placement of workloads on appropriate nodes of a node cluster based on workload requirements and node capabilities and/or resources availability. Further, workloads may be ranked based on a workload priority assigned to any particular workload, if available, or based on logged system calls issued by virtual machines hosting any particular workload. Subsequently, higher ranked workloads may be granted priority access to nodes that host healthier persistent memory, if any, or host higher performance traditional storage.

Figure 1:
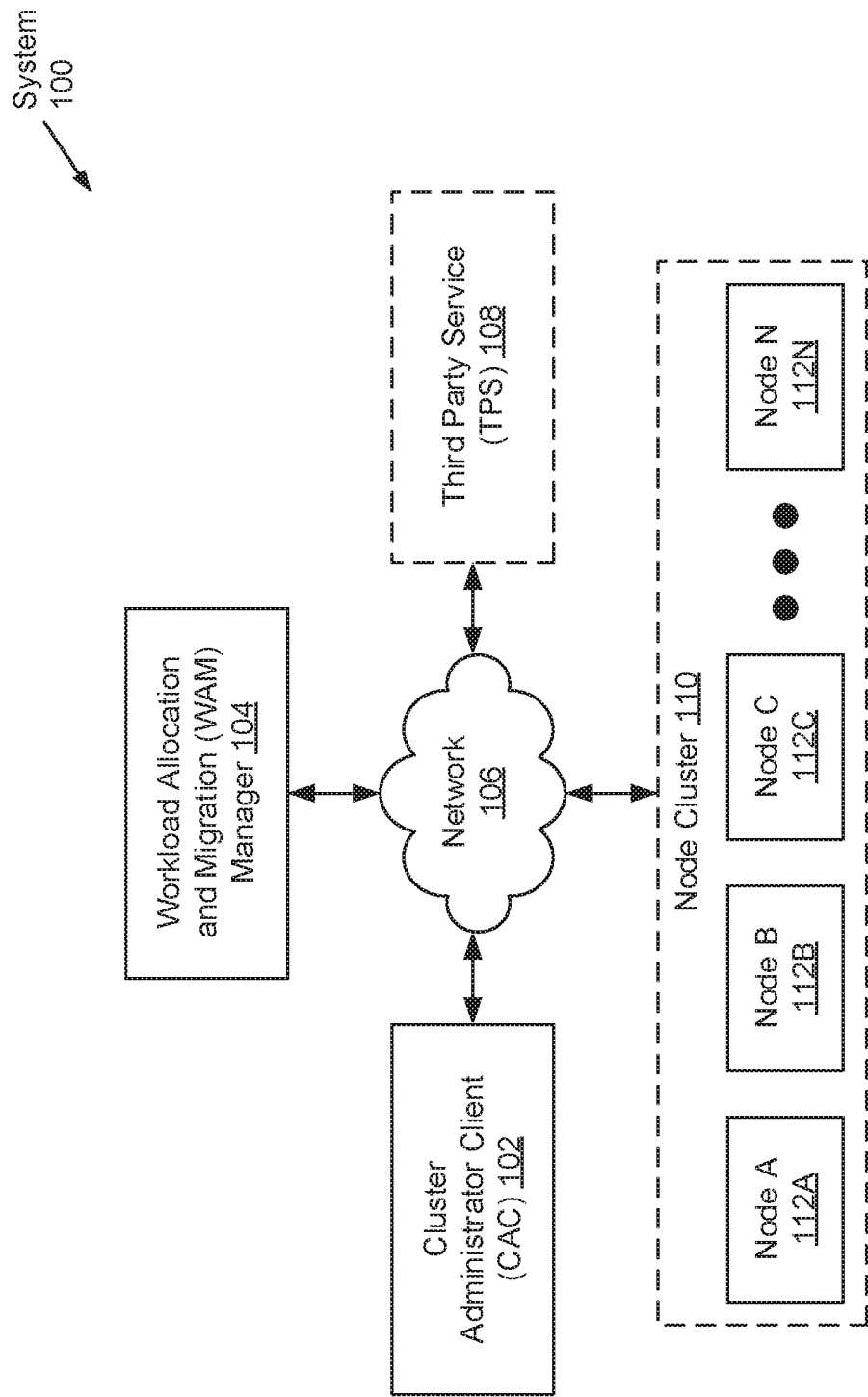
FIG. 1 shows a system in accordance with one or more embodiments of the invention.

FIG. 1 shows a system in accordance with one or more embodiments of the invention. The system (100) may include a cluster administrator client (CAC) (102), a workload allocation and migration (WAM) manager (104), one or more third-party services (TPS) (108) (optionally), and a node cluster (110). Each of these components is described below.

In one embodiment of the invention, the aforementioned components may be directly or indirectly connected to one another through a network (106) (e.g., a local area network (LAN), a wide area network (WAN) such as the Internet, a mobile network, or any other network). The network (106) may be implemented using any combination of wired and/or wireless connections. In embodiments in which the aforementioned components are indirectly connected, there may be other networking components or systems (e.g., switches, routers, gateways, etc.) that facilitate communications and/or information exchange. Further, the aforementioned components may communicate with one another using any combination of wired and/or wireless communication protocols.

In one embodiment of the invention, the CAC (102) may be any computing system (see e.g., FIG. 9) operated by an administrator of the node cluster (110). An administrator of the node cluster (110) may be an individual (or a group of individuals) who may be responsible for overseeing operations and maintenance pertinent to the hardware, software, and/or firmware elements of the node cluster (110). Further, the CAC (102) may include functionality to interact with the node cluster (110) and the WAM manager (104) through, for example, the submission of web application programming interface (API) requests and the receiving of corresponding web API responses. In one embodiment of the invention, the CAC (104) may interact with the WAM manager (104) by providing workload priority information (described below). Furthermore, one of ordinary skill will appreciate that the CAC (104) may perform other functionalities without departing from the scope of the invention. Examples of the CAC (102) include, but are not limited to, a desktop computer, a laptop computer, a tablet computer, a server, a mainframe, a smartphone, or any other computing system similar to the exemplary computing system shown in FIG. 9.

In one embodiment of the invention, the WAM manager (104) may be a physical device (i.e., hardware), a logical intelligence (i.e., software), or a combination thereof, with responsibilities directed to workload placement and migration in persistent memory capable computing environments. The WAM manager (104) may be implemented using one or more servers (not shown). Each server may be a physical server (i.e., in a datacenter) or a virtual server (i.e., residing in a cloud computing environment). In another embodiment of the invention, the WAM manager (104) may be implemented on one or more computing systems similar to the exemplary computing system shown in FIG. 9. Furthermore, the WAM manager (104) may include functionality to allocate workloads based on persistent memory availability in accordance with one or more embodiments of the invention (see e.g., FIGS. 8A and 8B). The WAM manager (104) is described in further detail below with respect to FIG. 4.

In one embodiment of the invention, a TPS (108) may be a third-party monitor and aggregator of node (112A-112N) information pertinent to one or more embodiments of the invention. The monitored and aggregated node (112A-112N) information may include, but is not limited to, virtual machine system call information (described below), persistent memory health information (described below), and traditional storage latency information (described below). Further, to facilitate the monitoring and aggregation of the aforementioned node (112A-112N) information, one or more monitoring instances (i.e., computer programs or processes), associated with and operatively connected to the TPS (108), may execute on each node (112A-112N) in the node cluster (110). A TPS (108) may be implemented using one or more servers (not shown). Each server may be a physical server (i.e., in a datacenter) or a virtual server (i.e., residing in a cloud computing environment).

In one embodiment of the invention, the node cluster (110) may refer to a group of linked nodes (112A-112N), which work separately or in combination towards servicing one or more specific usage scenarios. Each node (112A-112N) may be a physical appliance—e.g., a server (not shown) or any computing system similar to the exemplary computing system shown in FIG. 9. Further, each node (112A-112N) may manage a specific set of tasks, including the functionality of: monitoring and aggregating virtual machine system call information, persistent memory health information, and traditional storage latency information (described below) pertinent to the node (112A-112N); as well as submitting the aforementioned information to the WAM manager (104) and/or a TPS (108). One of ordinary skill will appreciate that the nodes (112A-122N) may perform other functionalities without departing from the scope of the invention. Nodes (112A-112N) are described in further detail below with respect to FIG. 2.

In one embodiment of the invention, the node cluster (110) and, accordingly, the nodes (112A-112N), may reflect hyper-convergent architecture. Hyper-convergent architecture may entail the software-centric or software-defined integration of virtualization, compute, storage, and networking resources into a single solution. The solution may take form as a software stack, a hardware appliance, or a combination thereof.

While FIG. 1 shows a configuration of components, other system configurations may be used without departing from the scope of the invention.

Figure 2:
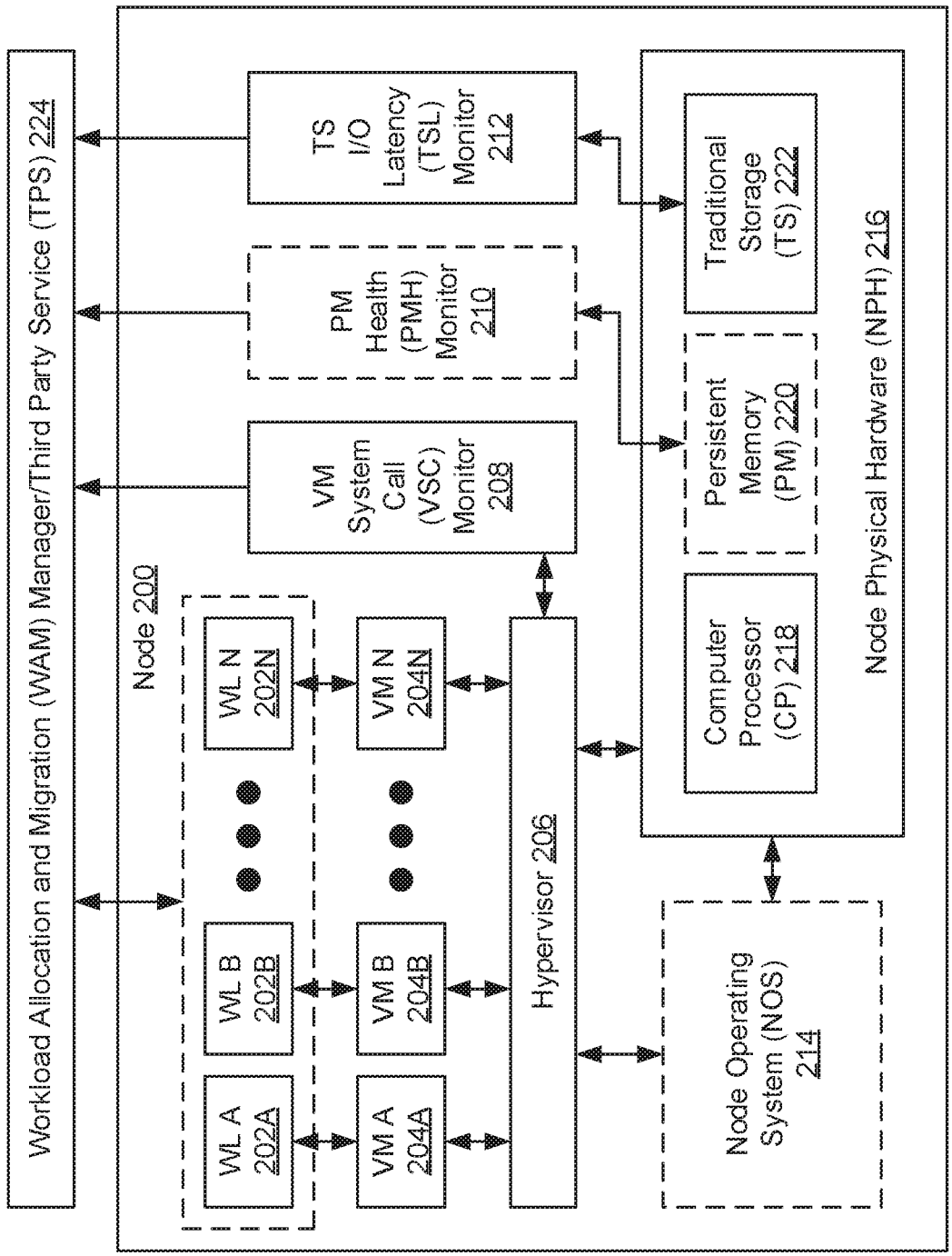
FIG. 2 shows a node in accordance with one or more embodiments of the invention.

FIG. 2 shows a node in accordance with one or more embodiments of the invention. As described above, a node (200) may be a physical appliance or computing system that may include functionality to monitor and aggregate virtual machine system call information, persistent memory health information, and traditional storage latency information pertinent to the node (200). To that end, a node (200) may include a hypervisor (206), one or more virtual machines (VMs) (204A-204N), a VM system call (VSC) monitor (208), a persistent memory (PM) health (PMH) monitor (210) (optionally), a traditional storage (TS) input-output (TO) latency (TSL) monitor (212), a node operating system (NOS) (214) (optionally), and node physical hardware (NPH) (216). Each of these components is described below.

In one embodiment of the invention, the hypervisor (206) may be a computer program or process (i.e., an instance of a computer program) that executes on the underlying hardware of the node (200). Specifically, the hypervisor (206) may be a computer program or process tasked with the management of the one or more VMs (204A-204N). Thus, the hypervisor (206) may include functionality to: create or delete a VM (204A-204N); allocate or deallocate host (i.e., node (200)) resources to support the execution of a VM (204A-204N) and their respective workloads (WLs) (202A-202N) (described below); and manage intra-host communication between a VM (204A-204N) and one or more other node components. In one embodiment of the invention, any such intra-host communication may, at least in part, take form as VM system calls (VSCs), which may entail requests from a VM (204A-204N) to any other node component, as well as requests from any other node component to a VM (204A-204N). One of ordinary skill will appreciate that the hypervisor (206) may perform other functionalities without departing from the scope of the invention.

In one embodiment of the invention, a VM (204A-204N) may be a computer program that executes on the underlying hardware of the node (200). Specifically, a VM (204A-204N) may be a computer program that emulates a physical computing system (see e.g., FIG. 9) and, thus, provides a self-contained execution environment on which one or more other computer programs (e.g., guest operating systems (OSs) and/or applications) may execute. Further, a VM (204A-204N) may access the underlying host (i.e., node (200)) hardware and interact with other host components using an abstraction layer—e.g., the hypervisor (206). In one embodiment of the invention, the above-mentioned other computer programs, hosted by a VM (204A-204N), may represent a workload (WL) (202A-202N) to a VM (204A-204N). More precisely, a WL (202A-202N) may refer to a characterization of the work and/or tasks that a VM (204A-204N) and/or a guest computer program performs. WLs (202A-202N) are described in further detail below with respect to FIG. 3.

In one embodiment of the invention, the VSC monitor (208) may be a computer program or process (i.e., an instance of a computer program) that executes on the underlying hardware of the node (200). Specifically, the VSC monitor (208) may be a computer program or process tasked with aggregating virtual machine system call (VSC) information. VSC information may pertain to tracked information representative of logged VM system calls for each VM executing on the node (200). In one embodiment of the invention, if persistent memory (PM) is installed on the node (200), a subset of the logged VM system calls may be directed to the PM resources on the node (200). By way of an example, a VM system call directed to a PM resource may be a system call directed to a memory-mapped file. Furthermore, in one embodiment of the invention, the VSC monitor (208) may include functionality to: obtain VSC information from the hypervisor (206), whom may be managing VM intra-host communications (e.g., VM system calls); and provide the obtained VSC information to the workload allocation and migration (WAM) manager or a third-party service (TPS) (224). In one embodiment of the invention, the VSC monitor (208) may be a native computer program or process, which, accordingly, may direct VSC information to the WAM manager (224). In another embodiment of the invention, the VSC monitor (208) may be a third-party computer program or process, which, accordingly, may alternatively direct VSC information to a TPS (224).

In one embodiment of the invention, the PMH monitor (210) may be a computer program or process (i.e., an instance of a computer program) that executes on the underlying hardware of the node (200). In one embodiment of the invention, the PMH monitor (210) may optionally exist on the node (200) based on whether the node (200) includes persistent memory (PM) (220) (described below). In another embodiment of the invention, the PMH monitor (210) may exist on the node (200) despite non-existence of PM on the node (210). Further, more specifically, the PMH monitor (210) may be a computer program or process tasked with aggregating persistent memory health (PMH) information. PMH information may pertain to tracked information, in the form of memory-storage codes (MSC) (described below), directed to whether PM exists on the node (200) and, if so, also the operational condition of the PM. MSCs are described in further detail below with respect to FIG. 6. Moreover, in one embodiment of the invention, the PMH monitor (210) may include functionality to: monitor the operational condition of PM (220) on the node (200), if any, to derive PMH information; and provide the obtained PMH information to the WAM manager or a TPS (224). In one embodiment of the invention, the PMH monitor (210) may be a native computer program or process, which, accordingly, may direct PMH information to the WAM manager (224). In another embodiment of the invention, the PMH monitor (210) may be a third-party computer program or process, which, accordingly, may alternatively direct PMH information to a TPS (224).

In one embodiment of the invention, the TSL monitor (212) may be a computer program or process (i.e., an instance of a computer program) that executes on the underlying hardware of the node (200). Specifically, the TSL monitor (212) may be a computer program or process tasked with aggregating traditional storage latency (TSL) information. TSL information may pertain to tracked information, in the form of a data object or structure, directed to measured disk IO latencies exhibited by traditional storage (TS) (222) (described below) on the node (200). Disk IO latency may refer to the time delay between a submission of an IO request for data in storage, and the return of the data. Further, in one embodiment of the invention, the TSL monitor (212) may include functionality to: monitor disk IO latencies pertaining to TS (222) on the node (200) to derive TSL information; and provide the obtained TSL information to the WAM manager or TPS (224). In one embodiment of the invention, the TSL monitor (212) may be a native computer program or process, which, accordingly, may direct TSL information to the WAM manager (224). In another embodiment of the invention, the TSL monitor (212) may be a third-party computer program or process, which, accordingly, may alternatively direct TSL information to a TPS (224).

In one embodiment of the invention, the NOS (214) may be a computer program that executes on the underlying hardware of the node (200). Specifically, the NOS (214) may be a computer program tasked with managing the underlying hardware (e.g., NPH (216)) and other logical/software components executing on the node (200). Further, the NOS (214) may include functionality to, for example, support fundamental node functions; schedule tasks; allocate node resources; execute other computer programs and/or processes; and control peripherals (e.g., input and output devices such as a mouse, a keyboard, or a printer). One of ordinary skill will appreciate that the NOS (214) may perform other functionalities without departing from the scope of the invention.

In one embodiment of the invention, NPH (216) may refer to the various physical and/or tangible components of the node (200). These various physical components may include functionality to provide the framework and resources on which the logical components of the node (200) operate. Furthermore, NPH (216) may include, but is not limited to: one or more computer processors (CPs) (218), persistent memory (PM) (220), if any, and traditional storage (TS) (222). Each of these components is described below.

In one embodiment of the invention, a CP (218) may be an integrated circuit for processing instructions (i.e., computer readable program code and/or machine byte-code). Further, a CP (218) may encompass one or more cores, or micro-cores. In one embodiment of the invention, PM (220) may refer to physical computer memory, for data storage, that includes both storage and memory attributes. That is, PM (220) may be persistent (i.e., non-volatile) like TS (222) and, thereby, capable of holding data across power cycles. Meanwhile, PM (220) may also be byte-addressable like memory and, thereby, further capable of providing byte-level access of data to computer programs (and/or other logical components). Moreover, in one embodiment of the invention, TS (222) may refer to any non-PM, persistent data storage device or medium such as, for example, optical storage, magnetic storage, NAND Flash Memory, NOR Flash Memory, Magnetic Random Access Memory (M-RAM), Spin Torque RAM (ST-RAM), Phase Change Memory (PCM), or any other memory defined as a non-volatile Storage Class Memory (SCM).

Figure 3:
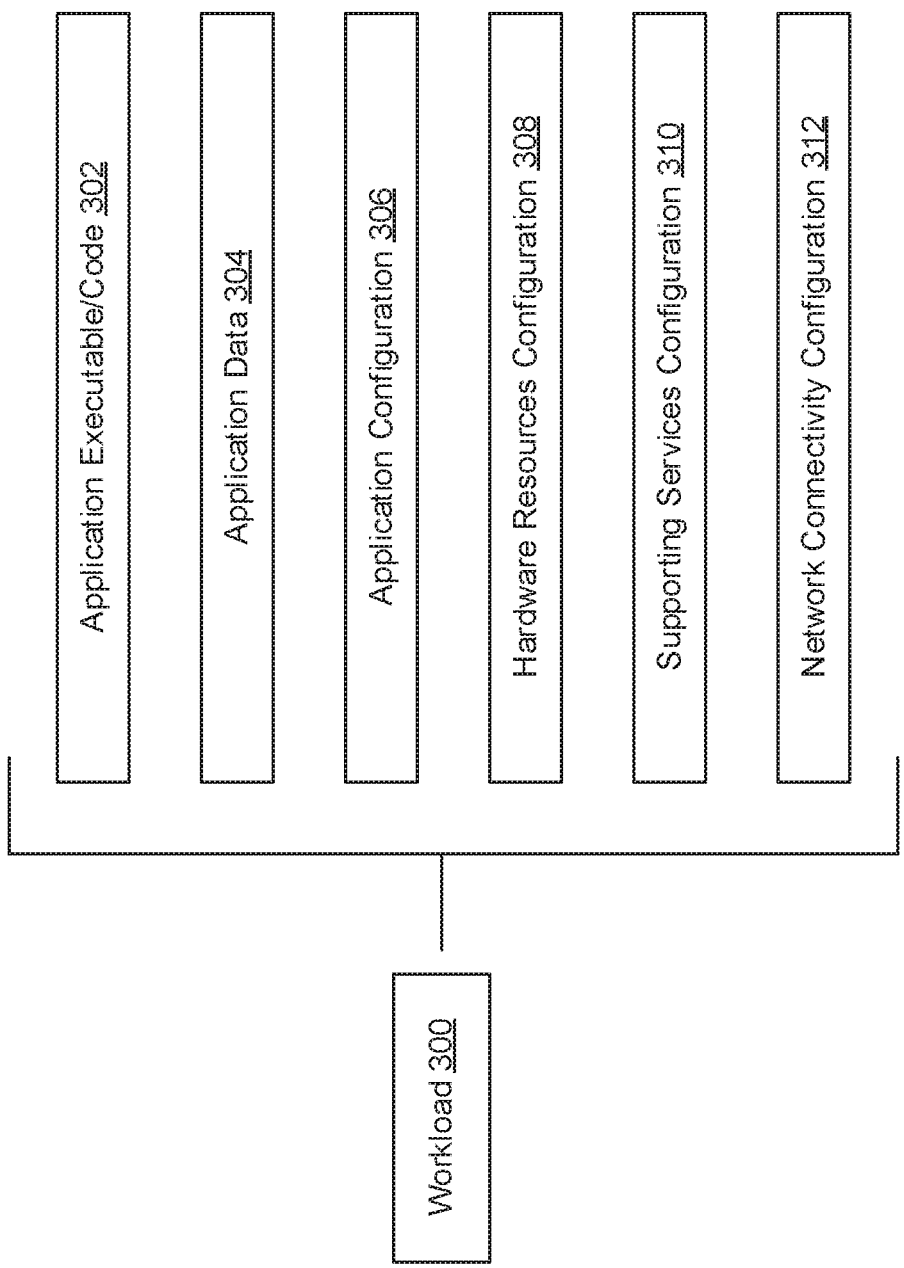
FIG. 3 shows a workload in accordance with one or more embodiments of the invention.

FIG. 3 shows a workload in accordance with one or more embodiments of the invention. As described above, a workload (300) may refer to a characterization of the work and/or tasks that a computer program (or application) performs. Substantively, a workload (300) may include, but is not limited to: an application executable or code (302), application data (304), an application configuration (306), a hardware resources configuration (308), a supporting services configuration (310), and a network connectivity configuration (312). Each of these components is described below.

In one embodiment of the invention, the application executable or code (302) may refer to computer readable program code (i.e., computer instructions) that implements the computer program (and the work/tasks respective to the computer program) associated with the workload (300). Further, in one embodiment of the invention, application data (304) may refer to any information specifically pertinent to the computer program associated with the workload (300). Application data (304) may entail any information created and managed by the computer program, and may include, for example, computer program state and cache (i.e., data stored temporarily to improve computer program performance). Moreover, in one embodiment of the invention, the application configuration (306) may refer to parameters, preferences, and/or settings specific to the computer program associated with the workload (300). Specifically, the application configuration (306) may include policies and/or objects that may influence the operational behavior of the computer program.

In one embodiment of the invention, the hardware resources configuration (308) may refer to a specification of hardware-pertinent requirements necessary for the computer program (associated with the workload (300)) to execute efficiently. By way of examples, the hardware resources configuration (308) may specify the following minimal hardware prerequisites: two (2) computer processing units (CPUs) rated at least at two (2) gigahertz (GHz) apiece, fifty (50) gigabytes (GB) of persistent disk space, and six (6) GB of random access memory (RAM). Further, in one embodiment of the invention, the supporting services configuration (310) may refer to a specification of support-pertinent requirements necessary for the computer program (associated with the workload (300)) to execute efficiently. Support services may pertain to other computer programs or logic that supports the operation of the computer program. Moreover, in one embodiment of the invention, the network connectivity configuration (312) may refer to a specification of network-pertinent requirements necessary for the computer program (associated with the workload (300)) to execute efficiently.

Figure 4:
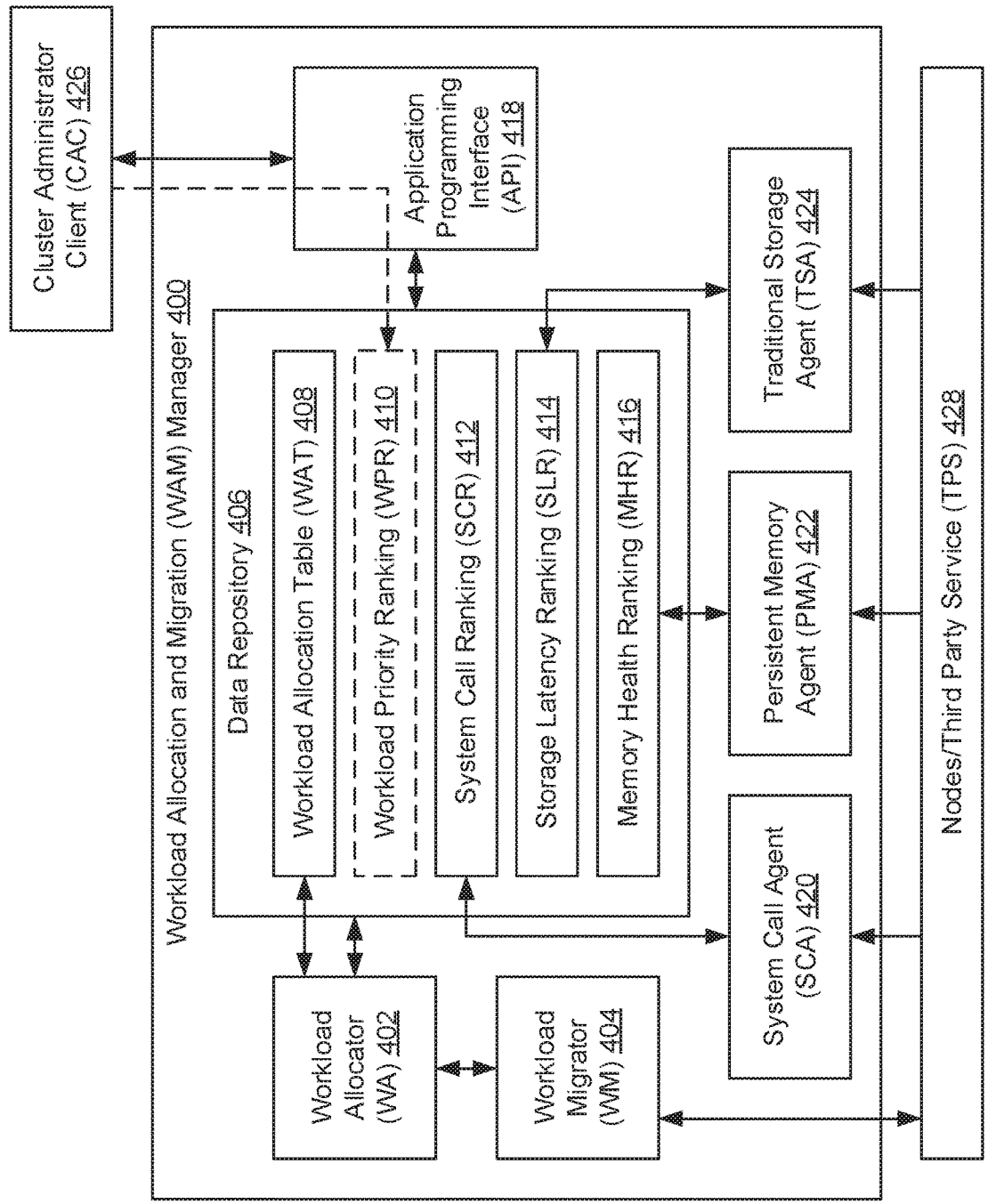
FIG. 4 shows a workload allocation and migration manager in accordance with one or more embodiments of the invention.

FIG. 4 shows a workload allocation and migration (WAM) manager in accordance with one or more embodiments of the invention. As mentioned above, the WAM manager (400) may be a physical device (i.e., hardware), a logical intelligence (i.e., software), or a combination thereof, with responsibilities directed to workload placement and migration in persistent memory capable computing environments. To that end, the WAM manager (400) may include a workload allocator (WA) (402), a workload migrator (WM) (404), a data repository (406), an application programming interface (API) (418), a system call agent (SCA) (420), a persistent memory agent (PMA) (422), and a traditional storage agent (TSA) (424). Each of these components is described below.

In one embodiment of the invention, the WA (402) may be a computer program or process (i.e., an instance of a computer program) that executes on the underlying hardware of the WAM manager (400). Specifically, the WA (402) may be a computer program or process tasked with the allocation of workloads (not shown) to appropriate nodes (428) (see e.g., FIG. 2). To that end, the WA (402) may include functionality to: assess and manage workload needs; track node (428) capabilities and resource availability; and allocate workloads to appropriate nodes based at least on a mating of the workload needs to node (428) capabilities and resource availability. In one embodiment of the invention, the WA (402) may include functionality to maintain a workload allocation table (WAT) (408), stored in the data repository (406), based at least on a workload priority ranking (WPR) (410) (if available), a system call ranking (SCR) (412), a storage latency ranking (SLR) (414), and a memory health ranking (MHR) (416)—each of which may also be stored in the data repository (406). Furthermore, workload allocation may pertain to an initial placement or assignment of a workload to an initial appropriate node (420).

In one embodiment of the invention, the WM (404) may be a computer program or process (i.e., an instance of a computer program) that executes on the underlying hardware of the WAM manager (400). Specifically, the WM (404) may be a computer program or process tasked with the migration of workloads (not shown) to appropriate nodes (428). To that end, the WM (404) may include functionality to: monitor workload needs; track node (428) capabilities and resource availability; and migrate workloads to appropriate nodes based at least on a mating of the workload needs to node (428) capabilities and resource availability. Furthermore, workload migration may pertain to transfer of a workload from a first placement/assignment on a first appropriate node (428) to a second placement/assignment on a second appropriate node (428). Migrations may be triggered based on: (a) the changing of workload needs over time; and (b) the introduction of new workloads with priority access (described below) to certain node (428) capabilities or resources.

In one embodiment of the invention, the data repository (406) may be a storage system or media for consolidating various forms of information. The data repository (406) may be implemented across one or more physical and/or virtual storage units or devices, which may or may not be of the same type or co-located in a same computing system (see e.g., FIG. 9). Furthermore, the information consolidated in the data repository (406) may be arranged using any storage mechanism (e.g., a filesystem, a database, a collection of tables, etc.). In one embodiment of the invention, the data repository (406) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

In one embodiment of the invention, information consolidated in the data repository (406) may include, but is not limited to, a workload allocation table (WAT) (408), a workload priority ranking (WPR) (410) (optionally), a system call ranking (SCR) (412), a storage latency ranking (SLR) (414), and a memory health ranking (MHR) (416). Each of these data objects or structures are described in further detail below with respect to FIGS. 7 and 5A-5D, respectively.

In one embodiment of the invention, the API (418) may be a hardware and/or software implemented construct that employs a set of subroutine definitions, protocols, and/or tools for enabling communications and information exchange between the WAM manager (400) and other external entities (e.g., the cluster administrator client (CAC) (426), one or more nodes and one or more third-party services (TPSs) (428), etc.). The API (418) may include functionality to: receive API requests from the external entities; process API requests to, for example, obtain or store data; and provide outcomes, if any, based on the processing as API responses to the appropriate external entities. In one embodiment of the invention, the API (418) may include functionality to: obtain workload priority information from the CAC (426); and maintain the WPR (410), stored in the data repository (406), based at least on the obtained workload priority information. Further, one of ordinary skill will appreciate that the API (418) may perform other functionalities without departing from the scope of the invention. By way of an example, the API (418) may be a web API that may be accessed through an assigned web address (e.g., a uniform resource locator (URL)) and a WAN (e.g., Internet) connection.

In one embodiment of the invention, the SCA (420) may be a computer program or process (i.e., an instance of a computer program) that executes on the underlying hardware of the WAM manager (400). Specifically, the SCA (420) may be a computer program or process tasked with aggregating and managing virtual machine system call (VSC) information (described above). To that end, the SCA (420) may include functionality to: obtain VSC information from one or more nodes, or a TPS (428); and maintain the SCR (412), stored in the data repository (406), based at least on the obtained VSC information.

In one embodiment of the invention, the PMA (422) may be a computer program or process (i.e., an instance of a computer program) that executes on the underlying hardware of the WAM manager (400). Specifically, the PMA (422) may be a computer program or process tasked with aggregating and managing persistent memory health (PMH) information (described above). To that end, the PMA (422) may include functionality to: obtain PMH information from one or more nodes, or a TPS (428); and maintain the MHR (416), stored in the data repository (406), based at least on the obtained PMH information.

In one embodiment of the invention, the TSA (424) may be a computer program or process (i.e., an instance of a computer program) that executes on the underlying hardware of the WAM manager (400). Specifically, the TSA (424) may be a computer program or process tasked with aggregating and managing traditional storage latency (TSL) information (described above). To that end, the TSA (424) may include functionality to: obtain TSL information from one or more nodes, or a TPS (428); and maintain the SLR (414), stored in the data repository (406), based at least on the obtained TSL information.

Figure 5B:
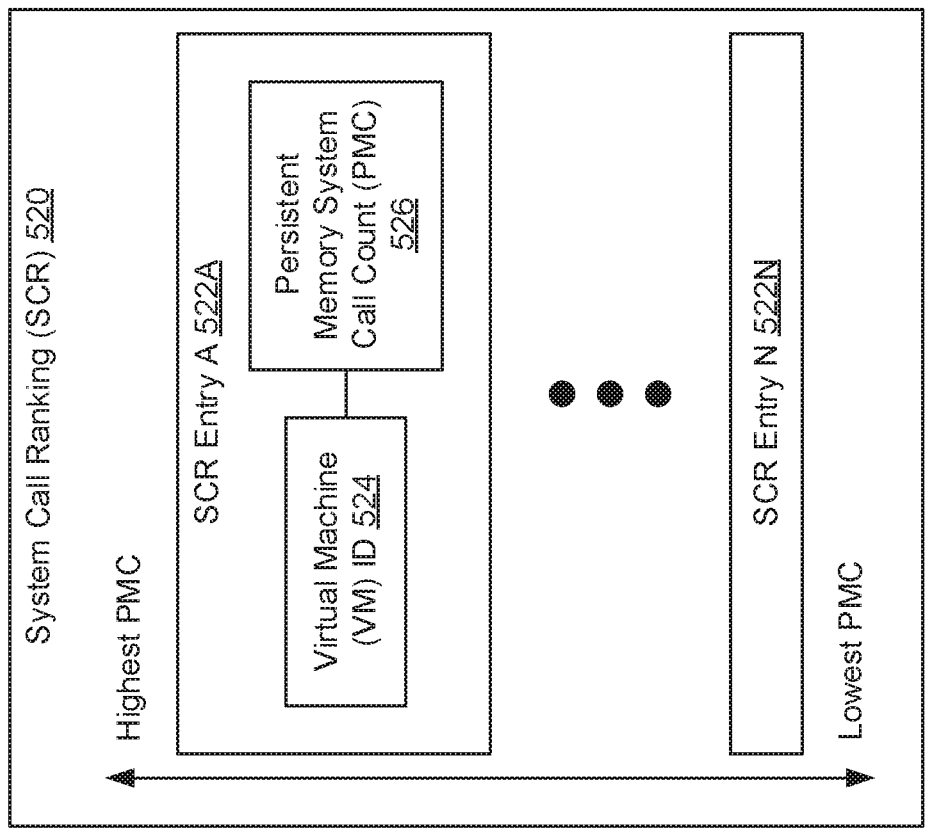
FIG. 5B shows a system call ranking in accordance with one or more embodiments of the invention.
Figure 5A:
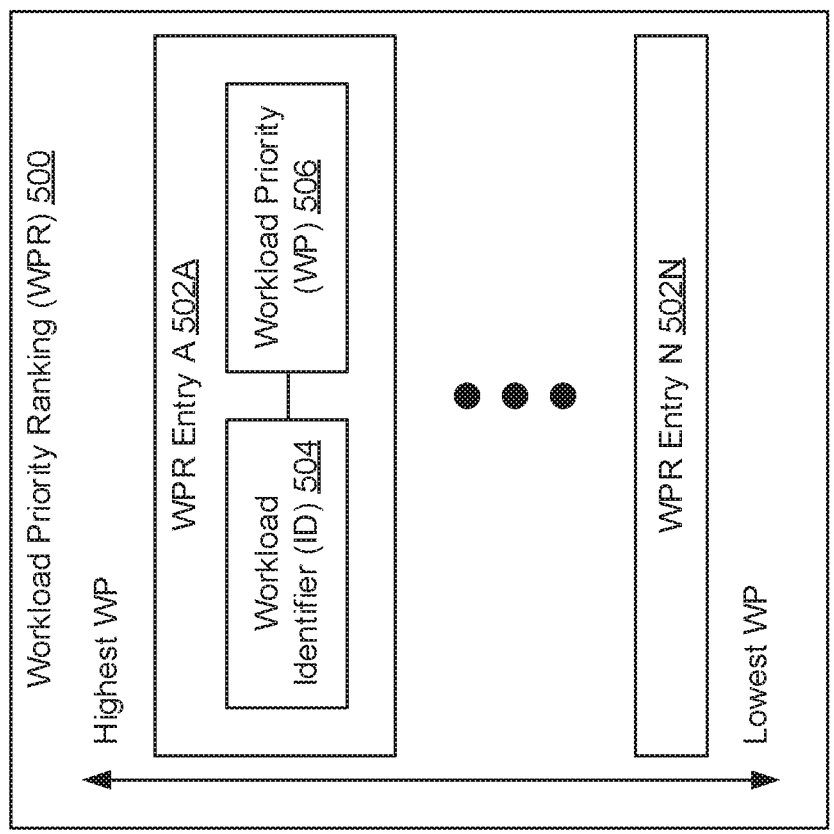
FIG. 5A shows a workload priority ranking in accordance with one or more embodiments of the invention.

FIG. 5A shows a workload priority ranking (WPR) in accordance with one or more embodiments of the invention. The WPR (500) may be a data object or structure directed to consolidating and sorting workload priorities. The WPR (500) may be maintained by an application programming interface (API) of the workload allocation and migration (WAM) manager (see e.g., FIG. 4) based on workload priority information obtained from a cluster administrator client (CAC) (see e.g., FIG. 1). Further, in one embodiment of the invention, the WPR (500) may consolidate and sort workload priorities as one or more WPR entries (502A-502N). Each WPR entry (502A-502N) may be a data container within which various related items of information reside. These related items of information include a workload identifier (ID) (504) and a workload priority (WP) (506). Each of these items of information is described below.

In one embodiment of the invention, the workload ID (504) may refer to a string of characters (e.g., letters, numbers, symbols, etc.) that uniquely identify a workload (described above). Further, the workload ID (504) may entail any number and/or combination of characters. By way of an example, the workload ID (504) may be represented through an alphanumeric tag or a N-bit integer (where N>0) expressed in hexadecimal notation. In one embodiment of the invention, the WP (506) may refer to a classification that designates a priority to node capabilities and/or resources assigned to the workload (associated with the workload ID (504)) by operators of the CAC (i.e., administrators of a node cluster). That is, a WP (506) may be assigned to a workload based on, for example, a significance, a complexity, or any other factor, that distinguishes the workload. By way of examples, the WP (506) may take form as a numerical, categorical, or ordinal label.

In one embodiment of the invention, there may be one WPR entry (502A-502N) for each workload instantiated across all nodes in the node cluster. Furthermore, the one or more WPR entries (502A-502N) may be sorted or ranked within the WPR (500) based on the WP (506) specified therein. With respect to workload allocation and migration, workloads associated with higher WPs (506) may be prioritized over workloads associated with lower WPs (506).

FIG. 5B shows a system call ranking (SCR) in accordance with one or more embodiments of the invention. The SCR (520) may be a data object or structure directed to consolidating and sorting virtual machine system call (VSC) information (described above). The SCR (520) may be maintained by a system call agent (SCA) of the WAM manager (see e.g., FIG. 4) based on VSC information obtained from one or more nodes, or a TPS. Further, in one embodiment of the invention, the SCR (520) may consolidate and sort VSC information (i.e., particularly, persistent memory (PM) relevant VSC information) as one or more SCR entries (522A-522N). Each SCR entry (522A-522N) may be a data container within which various related items of information reside. These related items of information include a virtual machine (VM) identifier (ID) (524) and a persistent memory system call count (PMC) (526). Each of these items of information is described below.

In one embodiment of the invention, the VM ID (524) may refer to a string of characters (e.g., letters, numbers, symbols, etc.) that uniquely identify a VM. Further, the VM ID (524) may entail any number and/or combination of characters. By way of an example, the VM ID (524) may be represented through an alphanumeric tag or a N-bit integer (where N>0) expressed in hexadecimal notation. In one embodiment of the invention, the PMC (526) may refer to a numerical counter that tracks a frequency of system calls, issued by the VM (associated with the VM ID (524)), which were specifically directed to persistent memory (PM) resources.

In one embodiment of the invention, there may be one SCR entry (522A-522N) for each VM instantiated across all nodes in the node cluster. Furthermore, the one or more SCR entries (522A-522N) may be sorted or ranked within the SCR (520) based on the PMC (526) specified therein. With respect to workload allocation and migration, VMs and, subsequently, the workloads hosted by these respective VMs, associated with higher PMCs (526) may be prioritized over VMs (hosting workloads) associated with lower PMCs (526).

Figure 5D:
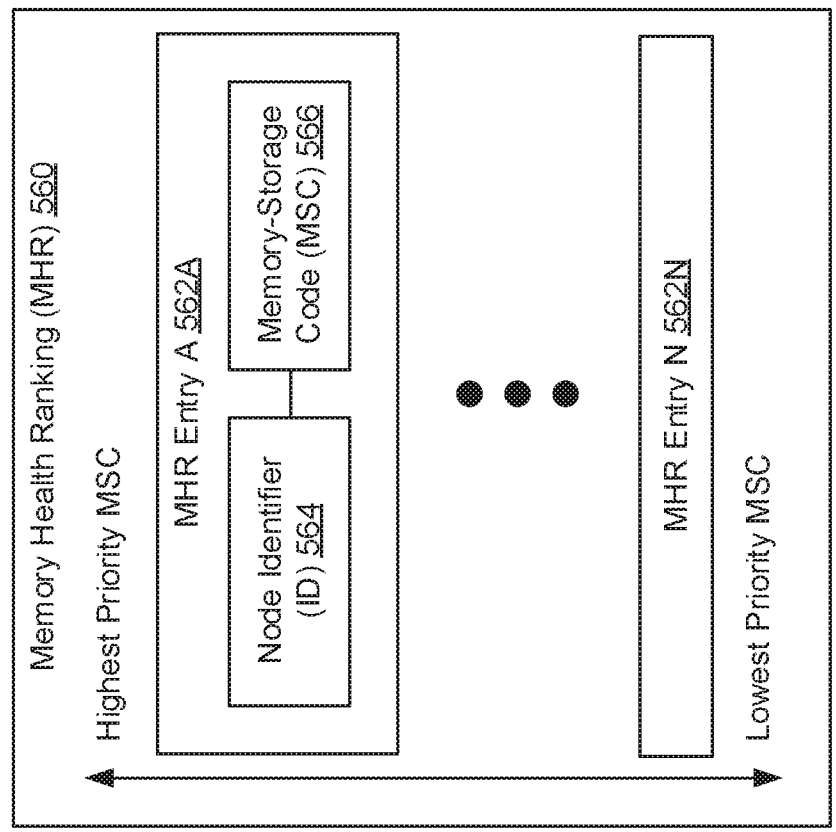
FIG. 5D shows a memory health ranking in accordance with one or more embodiments of the invention.
Figure 5C:
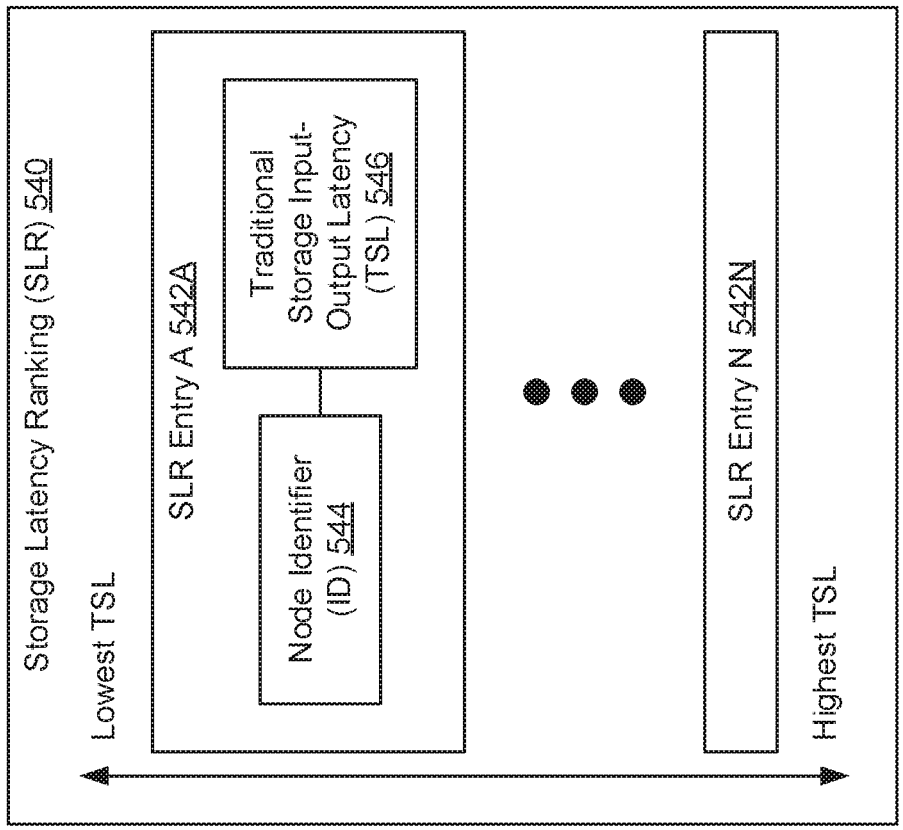
FIG. 5C shows a storage latency ranking in accordance with one or more embodiments of the invention.

FIG. 5C shows a storage latency ranking (SLR) in accordance with one or more embodiments of the invention. The SLR (540) may be a data object or structure directed to consolidating and sorting traditional storage latency (TSL) information (described above). The SLR (540) may be maintained by a traditional storage agent (TSA) of the WAM manager (see e.g., FIG. 4) based on TSL information obtained from one or more nodes, or a TPS. Further, in one embodiment of the invention, the SLR (540) may consolidate and sort TSL information as one or more SLR entries (542A-542N). Each SLR entry (542A-542N) may be a data container within which various related items of information reside. These related items of information include a node identifier (ID) (544) and a traditional storage input-output (IO) latency (TSL) (546). Each of these items of information is described below.

In one embodiment of the invention, the node ID (544) may refer to a string of characters (e.g., letters, numbers, symbols, etc.) that uniquely identify a node. Further, the node ID (544) may entail any number and/or combination of characters. By way of an example, the node ID (544) may be represented through an alphanumeric tag or a N-bit integer (where N>0) expressed in hexadecimal notation. In one embodiment of the invention, the TSL (546) may refer to a measured disk IO latency exhibited by traditional storage (TS) residing on the node (associated with the node ID (544)). Disk IO latency may refer to the time delay between a submission of an IO request for data in storage, and the return of the data.

In one embodiment of the invention, there may be one SLR entry (542A-542N) for each node of the node cluster. Furthermore, the one or more SLR entries (542A-542N) may be sorted or ranked within the SLR (540) based on the TSL (526) specified therein. With respect to workload allocation and migration, nodes associated with lower TSLs (646) may be prioritized over nodes associated with higher (TSLs) (646).

FIG. 5D shows a memory health ranking (MHR) in accordance with one or more embodiments of the invention. The MHR (560) may be a data object or structure directed to consolidating and sorting persistent memory health (PMH) information (described above). The MHR (560) may be maintained by a persistent memory agent (PMA) of the WAM manager (see e.g., FIG. 4) based on PMH information obtained from one or more nodes, or a TPS. Further, in one embodiment of the invention, the MHR (560) may consolidate and sort PMH information as one or more MHR entries (562A-562N). Each MHR entry (562A-562N) may be a data container within which various related items of information reside. These related items of information include a node identifier (ID) (544) and a memory-storage code (MSC) (566). Each of these items of information is described below.

In one embodiment of the invention, the node ID (564) may refer to a string of characters (e.g., letters, numbers, symbols, etc.) that uniquely identify a node. Further, the node ID (564) may entail any number and/or combination of characters. By way of an example, the node ID (564) may be represented through an alphanumeric tag or a N-bit integer (where N>0) expressed in hexadecimal notation. In one embodiment of the invention, the MSC (566) may refer to a classification that indicates the operational condition of persistent memory (PM), if any, residing on the node (associated with the node ID (564)). MSCs (566) are described in further detail below with respect to FIG. 6.

In one embodiment of the invention, there may be one MHR entry (562A-562N) for each node of the node cluster. Furthermore, the one or more MHR entries (562A-562N) may be sorted or ranked within the MHR (560) based on the MSC (566) specified therein. With respect to workload allocation and migration, nodes associated with hierarchically higher MSCs (566) may be prioritized over nodes associated with hierarchically lower MSCs (566).

Figure 6:
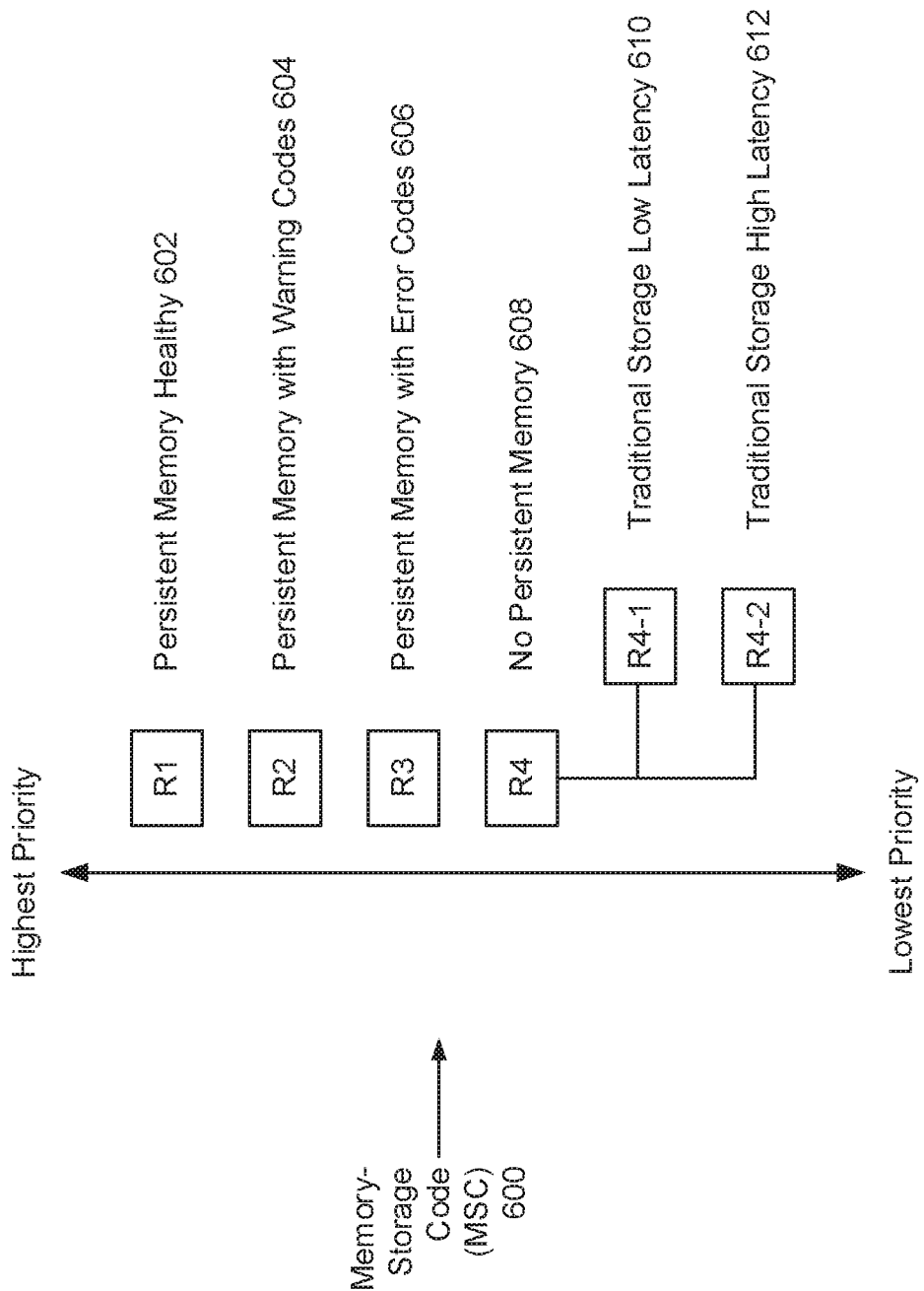
FIG. 6 shows memory storage codes in accordance with one or more embodiments of the invention.

FIG. 6 shows memory storage codes (MSC) in accordance with one or more embodiments of the invention. As described above, a MSC (600) may refer to a classification that indicates the operational condition of persistent memory (PM), if any, residing on any particular node of the node cluster. By way of an example, MSCs (600) may be expressed using alphanumeric tags, as portrayed in FIG. 6. The MSCs (600) exemplified in FIG. 6 show four (4) classes—i.e., classes R1 (602), R2 (604), R3 (606), and R4 (608)—whereby the last class may further be broken down into two (2) sub-classes—i.e., R4-1 (610) and R4-2 (612). Each of these classes and sub-classes is described below.

In one embodiment of the invention, class R1 (602) may refer to a classification of PM on any particular node, which may indicate that PM exists on the node and, further, that the operational condition of the PM has been assessed as healthy. A healthy operational condition may refer to PM that fails to exhibit any warning and/or error codes (described below).

In one embodiment of the invention, class R2 (604) may refer to a classification of PM on any particular node, which may indicate that PM exists on the node and, further, that the operational condition of the PM has been assessed as being directed to one or more warning codes. A warning code may refer to an enumerated message that logs the anomalous behavior of, or the occurrence of an unexpected event on, the PM. By way of examples, warning codes may pertain to predictive failure (i.e., indicating that a threshold (e.g., a temperature threshold, a lifetime threshold, an energy source threshold, etc.) tracked by the PM has been exceeded) and communication loss (i.e., indicating that the PM references a corrupt memory address and, subsequently, the host (e.g., node) of the PM has failed to initialize the PM because the PM cannot be read from or written to).

In one embodiment of the invention, class R3 (606) may refer to a classification of PM on any particular node, which may indicate that PM exists on the node and, further, that the operational condition of the PM has been assessed as being directed to one or more error codes. An error code may refer to an enumerated message that logs a clear physical and/or logical problem or defect with the PM. By way of examples, error codes may pertain to input-output (IO) error or transient error (i.e., indicating the loss of data persistence due to an unavailability of power and/or backup power) and unrecognized or stale metadata (i.e., indicating the failure of a data backup and/or restore feature of the PM, which tentatively leads to data loss).

In one embodiment of the invention, class R4 (608) may refer to a classification of PM on any particular node, which may indicate that PM does not exist on the node. Accordingly, because PM does not exist on the node, a classification of the capabilities and/or resources on that node fall back to an assessment of the performance of traditional storage (TS) (i.e., non-PM storage) residing on the node. By way of an example, TS performance may be gauged based on disk input-output (TO) latency. Disk IO latency may refer to the time delay between a submission of an IO request for data in storage, and the return of the data. One of ordinary skill, however, may appreciate that other TS performance metrics may be used to classify the capabilities and/or resources of a node such as, for example, IO operations per second (IOPS) and IO sequential throughput.

In one embodiment of the invention, sub-class R4-1 (610) may refer to a classification of PM on any particular node, which may indicate that PM does not exist on the node and, further, that the operational performance of TS thereon has been assessed as exhibiting low latency. On the other hand, in one embodiment of the invention, sub-class R4-2 (612) may refer to a classification of PM on any particular node, which may indicate that PM does not exist on the node and, further, that the operational performance of TS thereon has been assessed as exhibiting high latency. The categorizing of TS in exhibiting low latency or high latency may derive from a comparison between measured TS disk IO latency and a static (i.e., preset) or dynamic (i.e., updatable) disk IO latency threshold programmed by administrators of the node cluster. For example, the aforementioned disk IO latency threshold may be set to ten (10) milliseconds, whereby any measured TS disk IO latency below and up to the disk IO latency threshold may be directed to a low latency classification (i.e., sub-class R4-1 (610)), whereas any measured TS disk IO latency exceeding the disk IO latency threshold may be directed to a high latency classification (i.e., sub-class R4-2 (612)). Moreover, with respect to workload allocation and migration, MSCs (600) may be prioritized, from highest to lowest, in the following order: (a) class R1 (602); (b) class R2 (604); (c) class R3 (606); (d) class R4 (608), sub-class R4-1 (610); and (e) class R4 (608), sub-class R4-2 (612).

Figure 7:
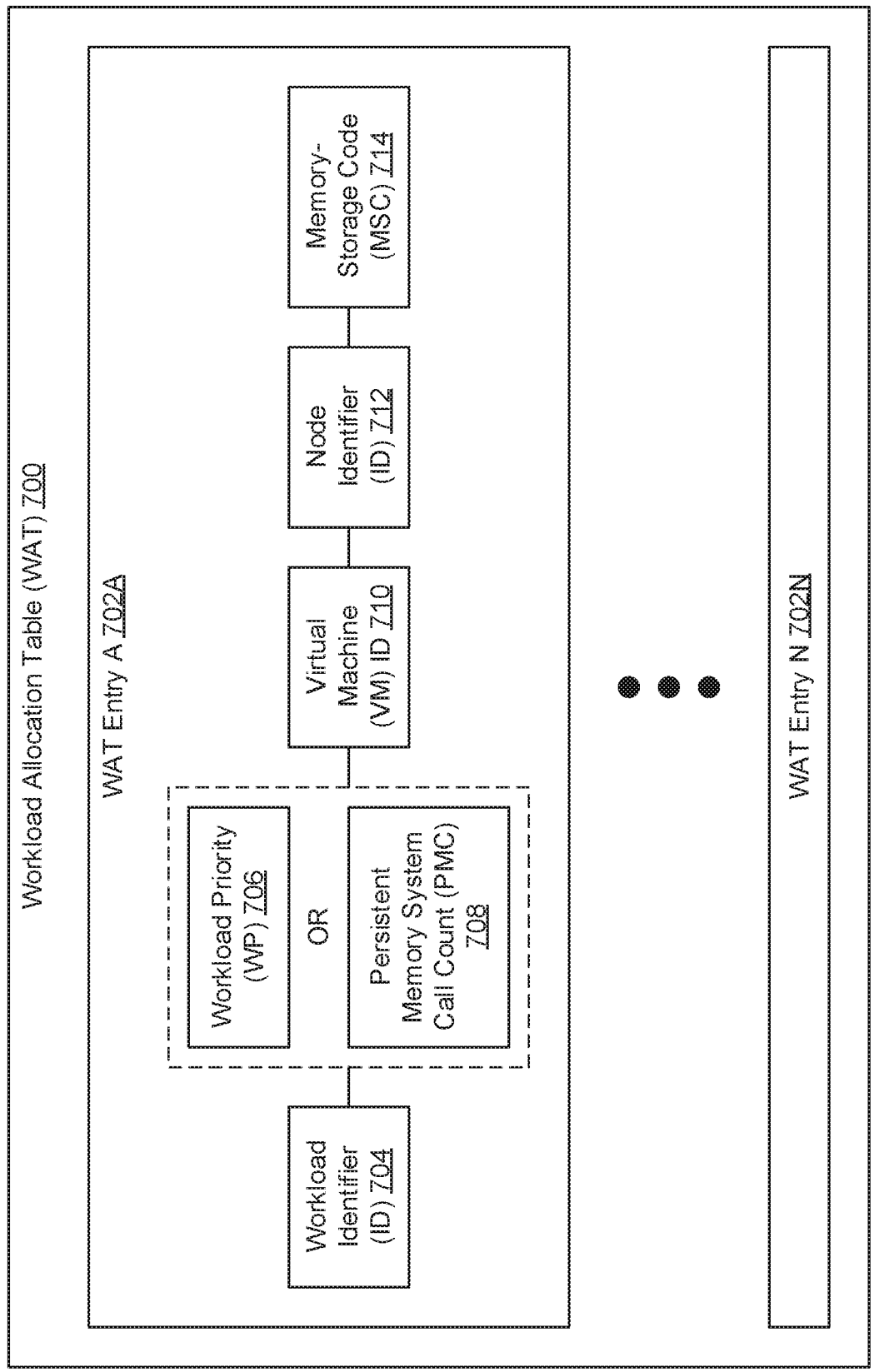
FIG. 7 shows a workload allocation table in accordance with one or more embodiments of the invention.

FIG. 7 shows a workload allocation table (WAT) in accordance with one or more embodiments of the invention. The WAT (700) may be a data object or structure directed to recording allocation and/or migration information pertaining to workloads across the node cluster. Workload allocation and/or migration information may refer to a placement of any particular workload hosted by an appropriate VM, hosted by an appropriate node, based on a best matching of workload needs to node capabilities and resources availability. The WAT (700) may be maintained by a workload allocator (WA) of the WAM manager (see e.g., FIG. 4) based at least on a workload priority ranking (WPR) (see e.g., FIG. 5A), a system call ranking (SCR) (see e.g., FIG. 5B), a storage latency ranking (SLR) (see e.g., FIG. 5C), and a memory health ranking (MHR) (see e.g., FIG. 5D). Further, in one embodiment of the invention, the WAT (700) may record workload allocation and/or migration information as one or more WAT entries (702A-702N). Each WAT entry (702A-702N) may be a data container within which various related items of information reside. These related items of information include a workload identifier (ID) (704), either a workload priority (WP) (706) (if available) or a persistent memory system call count (PMC) (708), a virtual machine (VM) ID (710), a node ID (712), and a memory-storage code (MSC) (714). Each of these items of information have been described in further detail above with respect to FIGS. 5A-6.

Figure 8A:
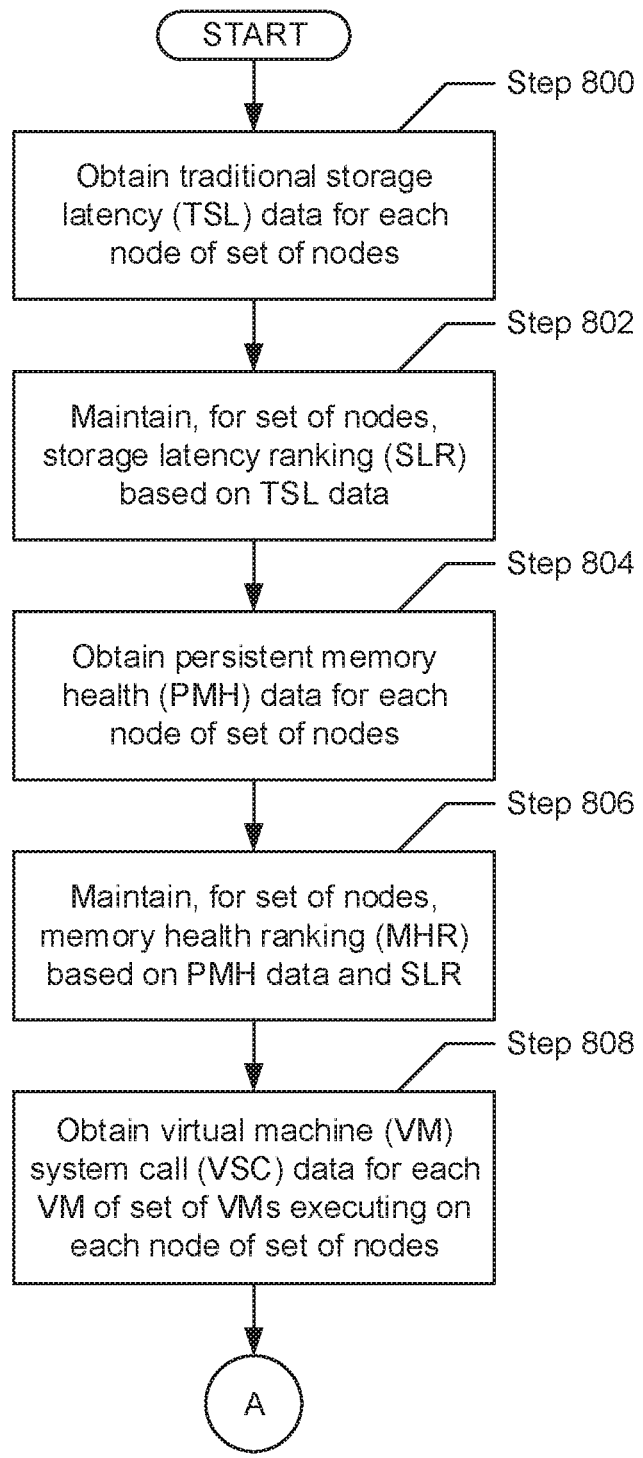
FIGS. 8A and 8B show flowcharts describing a method for allocating workloads based on persistent memory availability in accordance with one or more embodiments of the invention.
Figure 8B:
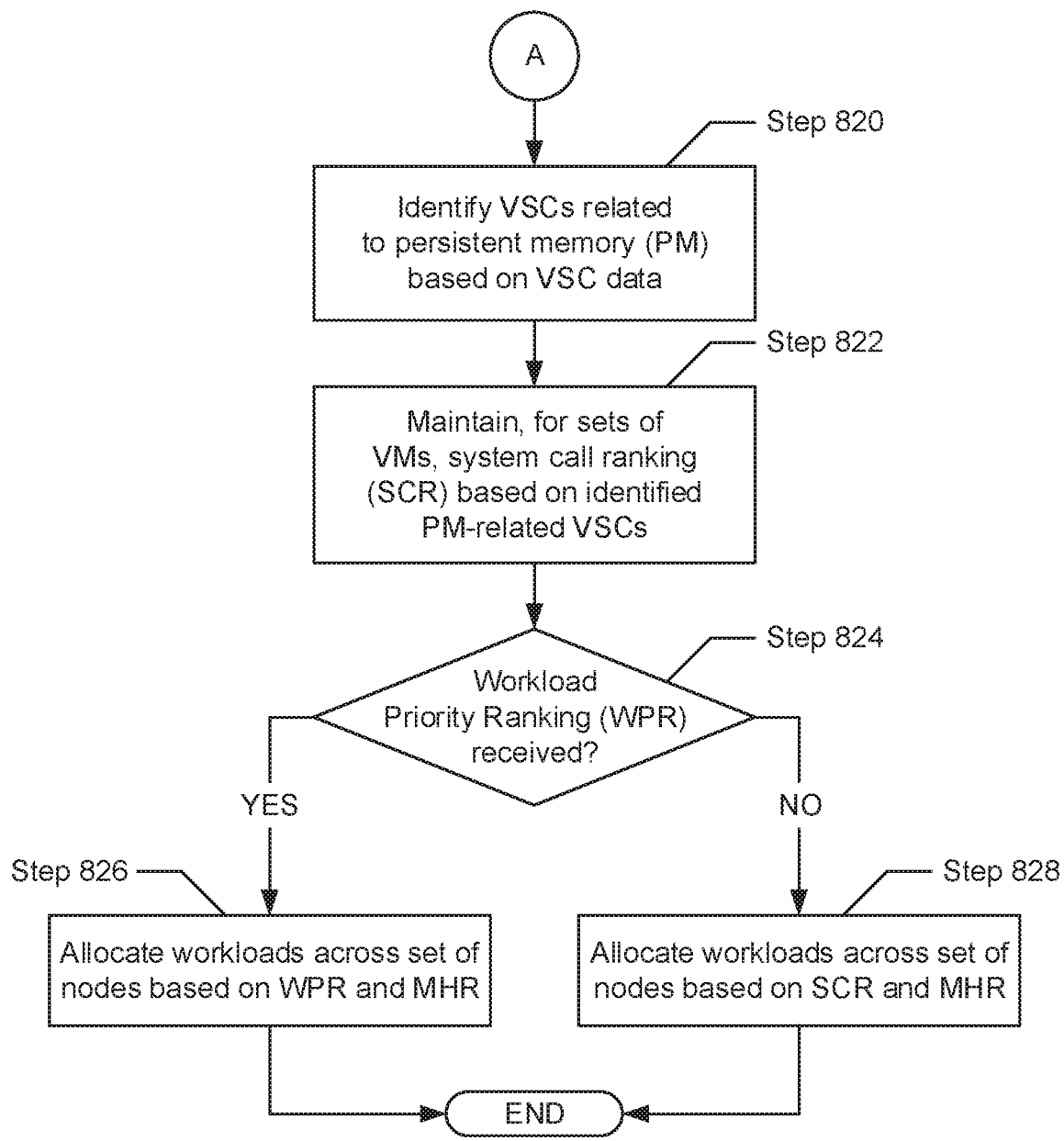

FIGS. 8A and 8B show flowcharts describing a method for allocating workloads based on persistent memory availability in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 8A, in Step 800, for each node of a node cluster, traditional storage latency (TSL) information is obtained. In one embodiment of the invention, TSL information may pertain to tracked information, in the form of a data object or structure, directed to measured disk input-output (IO) latencies exhibited by traditional storage (TS) (described below) on each node. Further, disk IO latency may refer to the time delay between a submission of an IO request for data in storage, and the return of the data.

In Step 802, a storage latency ranking (SLR) (see e.g., FIG. 5C) is maintained based on the TSL information (obtained in Step 800). In one embodiment of the invention, the SLR may be a data object or structure directed to consolidating and sorting TSL information. Specifically, the SLR may prioritize access to nodes with installed TS that exhibits lower disk IO latencies over nodes with installed TS that exhibits higher disk IO latencies.

In one embodiment of the invention, maintaining the SLR may entail: periodically monitoring and, thus, obtaining disk IO latency values for TS on each node of the node cluster; creating a new, or updating an existing, SLR entry for each node, which specifies a node identifier (ID) associated with a node, and a measured disk IO latency value for TS residing on the node; and sorting the SLR entries, based on the measured disk IO latency value specified therein, on a scale of lowest to highest disk IO latency values.

In Step 804, for each node of the node cluster, persistent memory health (PMH) information is obtained. In one embodiment of the invention, PMH information may pertain to tracked information, in the form of memory-storage codes (MSC) (see e.g., FIG. 6), directed to the availability and/or operational condition of persistent memory (PM) that may or may not be residing on each node. If PM is unavailable on a node, PMH information may further be directed to a performance assessment of available TS residing on the node.

In Step 806, a memory health ranking (MHR) (see e.g., FIG. 5D) is maintained based on the PMH information (obtained in Step 804) and the SLR (maintained in Step 802). In one embodiment of the invention, the MHR may be a data object or structure directed to consolidating and sorting PMH information. Specifically, the MHR may prioritize access to nodes with installed PM over nodes without installed PM. Further, with respect to nodes with installed PM: nodes with installed PM that fail to exhibit any warning and/or error codes may be prioritized over nodes with installed PM that exhibit at least one warning code (described above), followed by nodes with installed PM that exhibit at least one error code (described above). Moreover, with respect to nodes without installed PM: nodes with installed TS that exhibit, for example, lower TSLs may be prioritized over nodes with installed TS that exhibit, for example, higher TSLs.

In one embodiment of the invention, maintaining the MHR may entail: periodically monitoring and, thus, assessing whether each node hosts PM; if PM is installed on a node: prompting for and obtaining a health status of the PM to derive a MSC; if PM is not installed on a node: obtaining disk IO latency values, specified in the SLR (maintained in Step 802), for TS installed on the node to derive a MSC; creating a new, or updating an existing, MHR entry for each node, which specifies a node ID associated with a node, and a MSC derived for the node; and sorting the MHR entries, based on the MSC specified therein, on a scale of highest to lowest hierarchical priority of the MSC.

In Step 808, for each virtual machine (VM) of a set of VMs executing across all nodes of the node cluster, VM system call (VSC) information is obtained. In one embodiment of the invention, VSC information may pertain to tracked information representative of logged VSCs for each VM of the set of VMs. Further, a VSC may refer to any request submitted by a VM, executing on a node, to any other physical and/or logical component residing on the node.

Turning to FIG. 8B, in Step 820, PM-relevant VSCs are identified. That is, in one embodiment of the invention, if PM is available on a node, a subset of the logged VSCs for any VM executing on that node may be directed to the PM resources. By way of an example, a VSC directed to a PM resource may be a system call directed to a memory-mapped file.

In Step 822, a system call ranking (SCR) (see e.g., FIG. 5B) is maintained based on the PM-relevant VSCs (identified, if any, in Step 820). In one embodiment of the invention, the SCR may be a data object or structure directed to consolidating and sorting PM-relevant VSC information. Specifically, the SCR may grant priority access of PM resources on nodes, if any, to VMs that issue more PM-relevant VSCs over VMs that issue less PM-relevant VSCs.

Further, for VMs executing on nodes without PM installed, the frequency of PM-relevant VSCs issued by those VMs may be set to marked as non-applicable.

In one embodiment of the invention, maintaining the SCR may entail: periodically monitoring and, thus, obtaining VSC logs for each VM executing on each node of the node cluster; creating a new, or updating an existing, SCR entry for each VM, which specifies a VM identifier (ID) associated with a VM, and a frequency of PM-relevant VSCs issued by the VM—i.e., a persistent memory system call count (PMC), if applicable; and sorting the SCR entries, based on the PMC specified therein, on a scale of highest to lowest PMCs.

In Step 824, a determination is made as to whether a workload priority ranking (WPR) is available. In one embodiment of the invention, the WPR may be a data object or structure directed to consolidating and sorting workload priorities for each workload instantiated across all nodes of the node cluster. Further, these workload priorities may be maintained through the submission of workload priority information by administrators of the node cluster. Specifically, workload priority information and, subsequently, the WPR, may prioritize one or more workloads over one or more other workloads based on the discretion of the aforementioned node cluster administrators. With respect to the determination, if it is determined that the WPR is available (i.e., workload priority information has been received from a cluster administrator client (CAC)), then the process may proceed to Step 826. On the other hand, if it is alternatively determined that the WPR is unavailable (i.e., workload priority information has not been received by the CAC), then the process may alternatively proceed to Step 828.

In Step 826, after determining (in Step 824) that a WPR is available, an allocation (or re-allocation—i.e., migration) of one or more workloads, across the node cluster, is performed. In one embodiment of the invention, workloads may be allocated (or re-allocated) based at least on the WPR (determined to be available in Step 824) and the MHR (maintained in Step 806). That is, workloads assigned with higher workload priorities (WPs) may be granted access prioritization: (a) to nodes with installed PM and respective PM operational conditions directed to no warning and/or error codes; (b) followed by, to nodes with installed PM and respective operational conditions directed to at least one warning code; (c) followed by, to nodes with installed PM and respective operational conditions directed to at least one error code; (d) followed by, to nodes without installed PM, however, with installed TS exhibiting, for example, low disk IO latency; and (e) followed by, to nodes without installed PM, however, with installed TS exhibiting, for example, high disk IO latency. Furthermore, when prioritizing workload access to nodes without PM installed, information consolidated and sorted on the SLR (maintained in Step 802) may be relied upon.

In Step 828, after alternatively determining (in Step 824) that a WPR is unavailable, an allocation (or re-allocation—i.e., migration) of one or more workloads, across the node cluster, is performed. In one embodiment of the invention, workloads may be allocated (or re-allocated) based at least on the SCR (maintained in Step 822) and the MHR (maintained in Step 806). That is, workloads tied to VMs that have been observed to issue more PM-relevant VSCs may be granted access prioritization to: (a) to nodes with installed PM and respective PM operational conditions directed to no warning and/or error codes; (b) followed by, to nodes with installed PM and respective operational conditions directed to at least one warning code; (c) followed by, to nodes with installed PM and respective operational conditions directed to at least one error code; (d) followed by, to nodes without installed PM, however, with installed TS exhibiting, for example, low disk IO latency; and (e) followed by, to nodes without installed PM, however, with installed TS exhibiting, for example, high disk IO latency. Furthermore, when prioritizing workload access to nodes without PM installed, information consolidated and sorted on the SLR (maintained in Step 802) may be relied upon.

Figure 9:
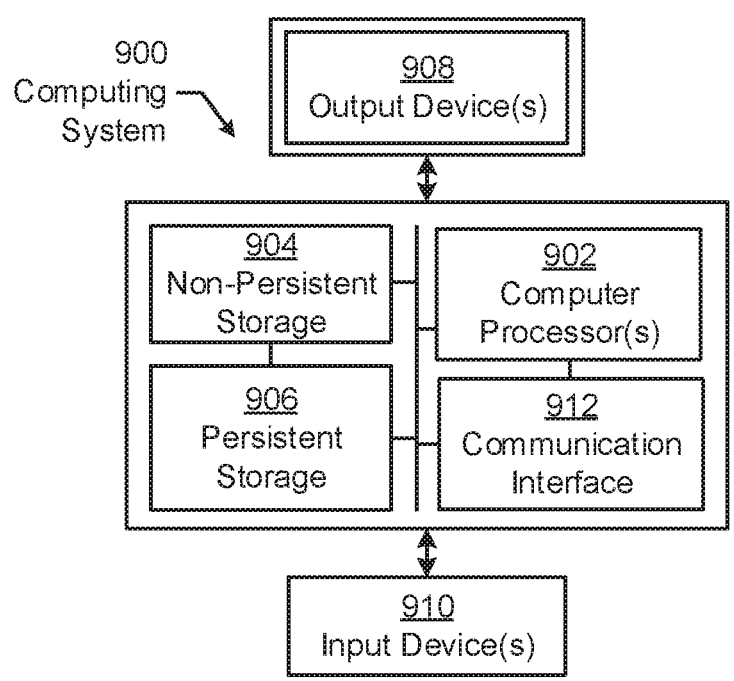
FIG. 9 shows a computing system in accordance with one or more embodiments of the invention.

FIG. 9 shows a computing system in accordance with one or more embodiments of the invention. The computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device. Further, the communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

In one embodiment of the invention, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assessing workload placement, by a workload allocation and migration (WAM) manager, across a node cluster based on persistent memory availability, comprising:
    obtaining traditional storage (TS) latency (TSL) information for each node of the node cluster;
    maintaining a storage latency ranking (SLR) based on the TSL information;
    obtaining persistent memory (PM) health (PMH) information for each node of the node cluster;
    maintaining a memory health ranking (MHR) based on the PMH information and the SLR;
    identifying a first workload for allocation;
    making a first determination that a workload priority (WP) for the first workload is available;
    assessing a first workload placement of the first workload on the node cluster based at least on the WP and the MHR; and
    allocating the first workload to a first node of the node cluster;
    identifying a second workload for allocation;
    making a second determination that a WP for the second workload is unavailable;
    obtaining, based on the second determination, virtual machine (VM) system call (VSC) information for each node of the node cluster;
    identifying, from the VSC information, a PM-relevant subset of the VSC information;
    maintaining a system call ranking (SCR) based on the PM-relevant subset of the VSC information;
    assessing a second workload placement of the second workload on the node cluster based at least on the SCR and the MHR; and
    allocating the second workload to a second node of the node cluster,
    wherein assessing the second workload placement of the second workload, comprises:
        identifying a VM, of a set of VMs executing across the node cluster,
        hosting the second workload;
    obtaining, using the SCR, a PM system call count (PMC) for the VM;
    associating the PMC with a high PMC classification;
        obtaining, using the MHR, a first memory-storage code (MSC) for the second node of the node cluster; and
        deducing, based on the first MSC, that the second node comprises a first TS and a first PM,
        wherein the first PM is healthy,
        wherein the first MSC is a first best match for the PMC.

2. The method of claim 1, wherein assessing the first workload placement of the first workload, comprises:
    associating the WP with a high WP classification;
    obtaining, using the MHR, a first memory-storage code (MSC) for the first node of the node cluster; and
    deducing, based on the first MSC, that the first node comprises a first TS and a first PM,
    wherein the first PM is healthy,
    wherein the first MSC is a first best match for the WP.

3. The method of claim 2, wherein assessing the first workload placement of the first workload, further comprises:
    making a third determination that the first node further comprises sufficient resources to instantiate the first workload;
    based on the third determination:
        identifying the first node as the first workload placement of the first workload; and
        allocating, based on the identifying, the first workload to the first node.

4. The method of claim 2, wherein assessing the first workload placement of the first workload, further comprises:
    making a third determination that the first node further comprises insufficient resources to instantiate the first workload;
    based on the third determination:
        obtaining, using the MHR, a second MSC for a third node of the node cluster; and
        deducing, based on the second MSC, that the third node comprises a second TS and a second PM,
        wherein the second PM has exhibited at least one warning code,
        wherein the second MSC is a second best match for the WP.

5. The method of claim 4, wherein assessing the first workload placement of the first workload, further comprises:
    making a fourth determination that the third node further comprises sufficient resources to instantiate the first workload;
    based on the fourth determination:
        identifying the third node as the first workload placement of the first workload; and
        allocating, based on the identifying, the first workload to the third node.

6. The method of claim 4, wherein assessing the first workload placement of the first workload, further comprises:
    making a fourth determination that the third node further comprises insufficient resources to instantiate the first workload;
    based on the fourth determination:
        obtaining, using the MHR, a third MSC for a third fourth node of the node cluster;
        deducing, based on the third MSC, that the third fourth node comprises a third TS and a third PM,
        wherein the third PM has exhibited at least one error code,
        wherein the third MSC is a third best match for the WP.

7. The method of claim 6, wherein assessing the first workload placement of the first workload, further comprises:
    making a fifth determination that the third node further comprises sufficient resources to instantiate the first workload;
    based on the fifth determination:
        identifying the third node as the first workload placement of the first workload; and
        allocating, based on the identifying, the first workload to the third node.

8. The method of claim 6, wherein assessing the first workload placement of the first workload, further comprises:
    making a sixth determination that the third node further comprises insufficient resources to instantiate the first workload;
    based on the sixth determination:
        obtaining, using the MHR, a fourth MSC for a fifth node of the node cluster;
        deducing, based on the fourth MSC, that the fifth node comprises a fourth TS and not any PM, wherein the fourth TS has exhibited high disk input-output (IO) latency, wherein the fourth MSC is a fourth best match for the WP;
        identifying, based on the deducing, the fifth node as the first workload placement of the first workload; and
        allocating, based on the identifying, the first workload to the fifth node.

9. The method of claim 1, wherein assessing the second workload placement of the second workload, further comprises:
  making a third determination that the second node further comprises sufficient resources to instantiate the second workload;
  based on the third determination:
    identifying the second node as the second workload placement of the second workload; and
    allocating, based on the identifying, the second workload to the second node.

10. The method of claim 1, wherein assessing the second workload placement of the second workload, further comprises:
  making a third determination that the second node further comprises insufficient resources to instantiate the second workload;
  based on the third determination:
    obtaining, using the MHR, a second MSC for a sixth node of the node cluster; and
    deducing, based on the second MSC, that the sixth node comprises a second TS and a second PM,
    wherein the second PM has exhibited at least one warning code,
    wherein the second MSC is a second best match for the PMC.

11. The method of claim 10, wherein assessing the second workload placement of the second workload, further comprises:
  making a fourth determination that the sixth node further comprises sufficient resources to instantiate the second workload;
  based on the fourth determination:
    identifying the sixth node as the second workload placement of the second workload; and
    allocating, based on the identifying, the second workload to the sixth node.

12. The method of claim 10, wherein assessing the second workload placement of the second workload, further comprises:
  making a fourth determination that the sixth node further comprises insufficient resources to instantiate the second workload;
  based on the fourth determination:
    obtaining, using the MHR, a third MSC for a seventh node of the node cluster;
    deducing, based on the third MSC, that the third node comprises a third TS and a third PM,
    wherein the third PM has exhibited at least one error code,
    wherein the third MSC is a third best match for the PMC.

13. The method of claim 12, wherein assessing the second workload placement of the second workload, further comprises:
  making a fifth determination that the seventh node further comprises sufficient resources to instantiate the second workload;
  based on the fifth determination:
    identifying the seventh node as the second workload placement of the second workload; and
    allocating, based on the identifying, the second workload to the seventh node.

14. The method of claim 13, wherein assessing the second workload placement of the second workload, further comprises:
  making a sixth determination that the seventh node further comprises insufficient resources to instantiate the second workload;
  based on the sixth determination:
    obtaining, using the MHR, a fourth MSC for a eighth node of the node cluster;
    deducing, based on the fourth MSC, that the eighth node comprises a fourth TS and not any PM, wherein the fourth TS has exhibited high disk input-output (IO) latency, wherein the fourth MSC is a fourth best match for the PMC;
    identifying, based on the deducing, the eighth node as the second workload placement of the second workload; and
    allocating, based on the identifying, the second workload to the eighth node.

15. A system for assessing workload placement across nodes of an information technology environment based on persistent memory availability, comprising:
  a node cluster; and
  a workload allocation and migration (WAM) manager, implemented on a physical server, operatively connected to the node cluster, and programmed to:
    obtain traditional storage (TS) latency (TSL) information for each node of the node cluster;
    maintain a storage latency ranking (SLR) based on the TSL information;
    obtain persistent memory (PM) health (PMH) information for each node of the node cluster;
    maintain a memory health ranking (MHR) based on the PMH information and the SLR;
    identify a first workload for allocation;
    make a first determination that a workload priority (WP) for the first workload is available; and
    assess a first workload placement of the first workload on the node cluster based at least on the WP and the MHR; and
    allocate the first workload to a first node of the node cluster;
    identify a second workload for allocation;
    make a second determination that a WP for the second workload is unavailable;
    obtain, based on the second determination, virtual machine (VM) system call (VSC) information for each node of the node cluster;
    identify, from the VSC information, a PM-relevant subset of the VSC information;
    maintain a system call ranking (SCR) based on the PM-relevant subset of the VSC information; and
    assess a second workload placement of the second workload on the node cluster based at least on the SCR and the MHR; and
    allocate the second workload to a second node of the node cluster,
    wherein assessing the second workload placement of the second workload, comprises:
      identifying a VM, of a set of VMs executing across the node cluster, hosting the second workload;
      obtaining, using the SCR, a PM system call count (PMC) for the VM;
      associating the PMC with a high PMC classification;
      obtaining, using the MHR, a first memory-storage code (MSC) for the second node of the node cluster; and
      deducing, based on the first MSC, that the second node comprises a first TS and a first PM, wherein the first PM is healthy,
wherein the first MSC is a first best match for the PMC.

16. The system of claim 15, wherein the WAM manager obtains the TSL information and the PMH information from each node of the node cluster.

17. The system of claim 15, further comprising:
a third-party service (TPS) operatively connected to the WAM manager and the node cluster,
wherein the WAM manager obtains the TSL information and the PMH information from the TPS,
wherein the TPS obtains the TSL information and the PMH information from each node of the node cluster.

18. A non-transitory computer readable medium (CRM) comprising computer readable program code for assessing workload placement across nodes of an information technology environment based on persistent memory availability, which when executed by a computer processor, enables the computer processor to:
obtain traditional storage (TS) latency (TSL) information for each node of a node cluster;
maintain a storage latency ranking (SLR) based on the TSL information;
obtain persistent memory (PM) health (PMH) information for each node of the node cluster;
maintain a memory health ranking (MHR) based on the PMH information and the SLR;
identify a first workload for allocation;
make a first determination that a workload priority (WP) for the first workload is available; and
assess a first workload placement of the first workload on the node cluster based at least on the WP and the MHR; and
allocate the first workload to a first node of the node cluster;
identify a second workload for allocation;
make a second determination that a WP for the second workload is unavailable;
obtain, based on the second determination, virtual machine (VM) system call (VSC) information for each node of the node cluster;
identify, from the VSC information, a PM-relevant subset of the VSC information;
maintain a system call ranking (SCR) based on the PM-relevant subset of the VSC information; and
assess a second workload placement of the second workload on the node cluster based at least on the SCR and the MHR; and
allocate the second workload to a second node of the node cluster,
wherein assessing the second workload placement of the second workload, comprises:
identifying a VM, of a set of VMs executing across the node cluster, hosting the second workload;
obtaining, using the SCR, a PM system call count (PMC) for the VM;
associating the PMC with a high PMC classification;
obtaining, using the MHR, a first memory-storage code (MSC) for the second node of the node cluster; and
deducing, based on the first MSC, that the second node comprises a first TS and a first PM,
wherein the first PM is healthy,
wherein the first MSC is a first best match for the PMC.

* * * * *